(12) United States Patent
Herzer

(10) Patent No.: US 7,129,698 B2
(45) Date of Patent: Oct. 31, 2006

(54) METHOD AND DEVICE FOR PREPARING A SENSOR SIGNAL OF A POSITION SENSOR FOR TRANSMISSION TO AN EVALUATION UNIT

(75) Inventor: Elmar Herzer, Nuremberg (DE)

(73) Assignee: Fraunhofer-Gesellschaft zur Foerderung der angewandten Forschung e.v., Munich (DE)

( * ) Notice: Subject to any disclaimer, the term of this patent is extended or adjusted under 35 U.S.C. 154(b) by 240 days.

(21) Appl. No.: 10/482,674

(22) PCT Filed: Jun. 27, 2002

(86) PCT No.: PCT/EP02/07136

§ 371 (c)(1),
(2), (4) Date: Aug. 24, 2004

(87) PCT Pub. No.: WO03/002950

PCT Pub. Date: Jan. 9, 2003

(65) Prior Publication Data

US 2005/0052179 A1      Mar. 10, 2005

(30) Foreign Application Priority Data

Jun. 27, 2001  (DE) ................. 101 30 838
Aug. 7, 2001   (DE) ................. 101 38 640

(51) Int. Cl.
*G01B 7/14* (2006.01)

(52) U.S. Cl. ................................. 324/207.11

(58) Field of Classification Search ............ 324/207.11–207.26; 702/150, 151, 198; 327/116, 327/173, 510, 511

See application file for complete search history.

(56) References Cited

U.S. PATENT DOCUMENTS

| 5,235,406 | A  | * | 8/1993 | Ishii et al. ............... 356/494 |
| 5,347,355 | A  | * | 9/1994 | Eguchi ..................... 356/494 |
| 5,880,586 | A  | * | 3/1999 | Dukart et al. .......... 324/207.2 |
| 6,097,318 | A  |   | 8/2000 | Hagl et al. |
| 6,265,992 | B1 |   | 7/2001 | Hagl et al. |
| 6,335,618 | B1 |   | 1/2002 | Nahum |
| 6,363,795 | B1 | * | 4/2002 | Bergqvist et al. ...... 73/861.77 |
| 6,434,516 | B1 | * | 8/2002 | Topmiller ................ 702/198 |

FOREIGN PATENT DOCUMENTS

| DE | 019815438 A1 | 10/1998 |
| DE | 10049368 A1  | 4/2001  |
| EP | 0463561 B1   | 1/1992  |
| JP | 02099826     | 2/1990  |

* cited by examiner

Primary Examiner—Edward Lefkowitz
Assistant Examiner—Kenneth J. Whittington
(74) Attorney, Agent, or Firm—Michael A. Glenn; Glenn Patent Group

(57) ABSTRACT

The present invention is based on the finding that the evaluation of the sensor signals of a position sensor with a mechanical period or, in general terms, the cooperation between position sensors and evaluation units, can be improved by eliminating divergence between the electrically optimal period and the mechanically optimal period. According to the present invention this is achieved in that the position sensor signal, which has a period which depends on the mechanical period of the scale of the position sensor, is translated into a translated signal with a period which corresponds to a second mechanical period, which e.g. has been set to the electrically optimal period, prior to—or for the purpose of—transmitting it to an evaluation unit, whereby not only can transmission errors be minimized and the evaluability improved but a complicated mechanical adjustment of the scale of the position sensor relative to the evaluation unit is avoided.

11 Claims, 7 Drawing Sheets

METHOD AND DEVICE FOR PREPARING A SENSOR SIGNAL OF A POSITION SENSOR FOR TRANSMISSION TO AN EVALUATION UNIT

BACKGROUND OF THE INVENTION

1. Field of the Invention

The present invention relates to position sensors which have a scale with a mechanical period and which emit sensor signals with a period which depends on the mechanical period such as e.g. a linear variable differential transformer (LVDT) or a rotational variable differential transformer (RVDT) and in particular to the preparation of such a sensor signal of a position sensor for output to an appropriate evaluation unit.

2. Description of the Related Art

Examples of position sensors which employ a mechanical scale to perform a path measurement or an angular measurement are linear variable differential transformers and rotational variable differential transformers, described hereafter as resolvers, and special arrangements of magnetoresistive resistors or Hall sensors which are used to measure a path or an angle of rotation α for mechanical arrangements or machines. These sensors supply two output signals which vary depending on the mechanical position, so that the position referred to a period section of the mechanical scale can be unambiguously determined from the signals.

FIG. 1a and FIG. 1c show examples of two different arrangements for measuring the linear position, while FIG. 1b shows an arrangement for measuring an angle of rotation. FIG. 1a exhibits an excitation coil 10 and two measurement coils 20 and 30 and a measurement object 40 with suitable material properties, such as e.g. a suitable magnetic susceptibility, which is arranged between the excitation coil 10 on one side and the measurement coils 20 and 30 on the other and which is moveable linearly along an axis 50. The arrangement is so conceived that a linear displacement of the measurement object 40 or the excitation coil 10 causes a change in the coupling relationship between the excitation coil 10 and the measurement coil 20 and between the excitation coil 10 and the measurement coil 30. An excitation voltage on the excitation coil 10 therefore produces signals in the measurement coils 20 and 30 which are in quadrature to each other. The position of the measurement object 40 can be defined as an angle α which determines the relationship between the two measurement signals, as will be explained below.

The arrangement shown in FIG. 1b corresponds to the arrangement shown in FIG. 1a with the exception of the measurement object 40. In this case the measurement object is represented by a rotatable body 50. When the body 50 is rotated the relationship between the measurement signals registered in the measurement coils 20 and 30 varies as in the arrangement in FIG. 1a according to the angle of rotation α, whereby the angle of rotation α can be determined.

FIG. 1c shows an alternative arrangement to that in FIG. 1a. It has magnetoresistive sensors 60 and 70 and a magnetic scale 80 constitutes the linearly displaceable measurement object. The magnetic scale 80 has two suitably oriented magnetic regions which generate opposing magnetic fields at the location of the magnetoresistive sensors 60 and 70, these regions being represented in FIG. 1c by four bar magnets 80a, 80b, 80c and 80d, the orientation of which alternates from one to the next. When the scale 80 is displaced along an axis 90 the magnetic field at the location of the magnetoresistive sensors 60 and 70 changes and so also therefore does the electrical resistance in such a way that the signals measured at the sensors 60 and 70 are in quadrature to each other.

In consequence, the variation of the signals is characterized in the first instance by the fact that they are substantially in quadrature to each other. FIG. 2 shows the connection between the value α on the one hand and the measurement signals at the coil 20 and the coil 30 on the other in relation to an excitation voltage $U_0$ for the measurement arrangement shown in FIG. 1b. The connection is also essentially true for the arrangement shown in FIG. 1c and FIG. 1a.

As can be seen from FIG. 2, the periodic signals Usin and Ucos defined in terms of the mechanical period $l_{PER}$ of the mechanical scale can be described by the following equations:

$$U\sin = U_0 \sin\left(\frac{2\pi\alpha}{l_{PER}}\right) \qquad \text{Eq. 1}$$

$$U\cos = U_0 \cos\left(\frac{2\pi\alpha}{l_{PER}}\right) \qquad \text{Eq. 2}$$

where $U_0$ may be a direct or alternating voltage or a direct or alternating current, such as $U_0=U_{pp}\cos(\omega t)$, Upp being the amplitude of the alternating voltage $U_0$.

FIG. 3 shows the signal profiles of the measurement signals Usin and Ucos of the sensors of FIGS. 1b and 1c as a function of the angle α or the linear displacement α. As can be seen, the variation of these signals is characterized by the fact that they are in quadrature to each other, i.e. they relate to one another like cosine and sine, and that the signals Ucos and Usin are periodic and that their period is equal to the mechanical period $l_{PER}$ of the mechanical scale. In the case of FIG. 1b the mechanical period $l_{PER}$ is e.g. equal to a full rotation, i.e. 360°, and in the case of FIG. 1c it is equal to the distance between two magnets with the same orientation. In other words, the signals Usin and Ucos only have a unique relationship to the measurement value α within a period $l_{PER}$ and they repeat themselves periodically when a number of period sections of length $l_{PER}$ succeed one another, e.g. in the case of two rotations.

In FIG. 4 the variation with time of the sensor signals Ucos and Usin is shown for the case of a constant rotational or translational movement. As can be seen, the signals Usin and Ucos are periodic signals which cover the value range of the signal profiles shown in FIG. 3 in successive periods. The time period length of the signals Ucos and Usin is equal to the quotient of the mechanical period $l_{PER}$ and the linear velocity or angular velocity v. After a time duration of $l_{PER}/v$ the relative rotation or displacement of the scale to the position sensor has covered a mechanical period $l_{PER}$. A non-constant rotation or speed of motion also produces periodic signals which do not, however, have a constant period but a fluctuating period.

Since nearly all the controls and regulators of mechanical systems are to an increasing extent realized digitally, the output signals Usin and Ucos of the sensors must normally be digitalized. To find a digital equivalent $\alpha_{DIG}$ of the position α, the ratio of Usin to Ucos must be evaluated. The required relationship is generally as follows:

$$\alpha_{DIG} = \arctan\left(\frac{U \sin}{U \cos}\right) \quad \text{Eq. 3}$$

Some evaluation methods digitalize both voltages Usin and Ucos and then calculate the arctangent digitally, others digitalize the two voltages Usin and Ucos simultaneously and hereby form the digital value $\alpha_{DIG}$ directly.

To transmit the sensor signals as generated by one of the sensors in FIG. 1a–1c and as shown as examples in FIG. 4 to an evaluation unit, where they are evaluated, e.g. digitalized, the solutions shown in FIGS. 5, 6 and 7 are traditionally used to connect the position sensor to an evaluation unit. In the following description of FIG. 5 to 7 it should be noted that identical elements in the drawings are denoted by the same reference numerals and that a repetition of the description of these identical elements is dispensed with.

FIG. 5 to 7 show in each case a position sensor 100, which, by means of a scale 110 with a mechanical period $l_{PER}$, registers a relative linear displacement 120 of the scale 110 in relation to the position sensor 100 or a displacement of the position sensor 100 in relation to the scale 110. In the case of FIG. 5 the position sensor is connected directly to an evaluation unit 130, the position sensor 100 being connected to the evaluation unit 130 via four transmission lines 140a, 140b, 140c and 140d in order to transmit the sensor signal Usin and the sensor signal Ucos differentially to the evaluation unit 130.

To reduce the transmission errors arising during the transmission from the position sensor 100 to the evaluation unit 130 due to the length of the transmission lines 140a–140d, in the solution for transmitting the sensor signals which is shown in FIG. 6 analog line drivers 150a and 150b, which are connected to the sensor 100 over lines 155a, 155b, 155c and 155d and which guarantee a better transmission through amplification or preparation of the sensor signals Usin and Ucos, are inserted in front of the transmission lines 140a–140d.

The solution for transmitting the sensor signals of the position sensor 100 to the evaluation unit 130 shown in FIG. 7 increases the reliability of the transmission of these signals by preparing or digitalizing them before transmitting them to the evaluation unit 130. Digitalization is achieved by means of an analog/digital converter 160 connected to the position sensor 100 and which receives the analog sensor signals Usin and Ucos, which are fed in differentially, digitalizes them, amplifies them in digitalized form by means of line drivers 160a and 160b at an output stage of the converter and sends them, in their digitalized and amplified form, to the evaluation unit 130 on transmission lines 170a and 170b. In contrast to the transmissions according to FIGS. 5 and 6, the sensor signals Usin and Ucos are already digitalized in the immediate vicinity of the position sensor 100 by the analog/digital converter 160 rather than later in the evaluation unit 130. The digital evaluation unit 130 can perform the previously mentioned calculation of the arc tangent on the basis of the digital sensor signals.

The evaluation of the sensor signals Usin and Ucos is substantially independent of the variation of the excitation voltage $U_0$, which means that the interference which occurs equally on both signals or on both line pairs 140a, 140b or 140c and 140d or on both lines 170a and 170b, has almost no effect on the evaluation result. Interference which is superimposed on only one of the two sensor signals Usin and Ucos, on the other hand, directly affects the measurement result. To achieve the best possible result it is therefore desirable to use the smallest possible mechanical period $l_{PER}$ so that the quotient of the sensor signals Usin and Ucos has to be determined only very imprecisely and only a few points of a period have to be evaluated at a certain resolution, thus minimizing the effect of unsymmetrical interference on the evaluation. An extreme case is that where the zero transitions and the maxima of both signals are sampled. In the digital representation of the sensor signals with one bit each the result is the increment signal which is common in industrial control engineering.

However, some problems stand in the way of achieving the smallest possible mechanical period in order to counteract asymmetrical interference with the in-quadrature signals. In the first place, mechanical and manufacturing problems mean that it is not always possible to make the scales sufficiently small, to attach them or to read them. Secondly, the frequency of the sensor signals of the position sensor 100 becomes very high at high rotational or translational velocities. In FIG. 4, in which exemplary sensor signals Ucos and Usin are shown as a function of time t for the case of a constant rotational or translational motion, the sampling time Δt between two samplings in the evaluation unit is also shown. As far as the maximum translational or rotational velocity is concerned, the evaluability of the sensor signals Ucos and Usin is therefore restricted by the bandwidth and the sampling speed Δt of the evaluation electronics or the evaluation unit, so that e.g. $\Delta t \leq \frac{1}{2}l_{PER}/v$ must hold true. A lower bound for the mechanical period also arises from the fact that higher frequency signals in the region of several megaherz can no longer be transmitted with little loss in the transmission lines. In addition to the interference from outside there is now also distortion of the signals due to line losses.

Taking into account the bandwidth and the sampling speed of the evaluation electronics as well as the transmission losses of the sensor signals, for any particular application characterized by a certain desired resolution of $\alpha_{DIG}$, the maximum actual translational or rotational velocity, the length of the transmission path over which the sensor signals must be transmitted to the evaluation unit, and the amount of interference incident along the transmission path, there is for the position sensor a mechanical period which generates sensor signals which can be transmitted and evaluated optimally. This mechanical period will be described as the electrically optimal period in what follows.

On the other hand, however, there exists a mechanical period which would be optimal as regards manufacture, attachment and readability from the mechanical point of view, and which is usually greater than the electrically optimal period and which will be called the mechanically optimal period in what follows. At high translational velocities it is, however, equally possible that the sensor is moved very quickly and that the optimal mechanical period from the mechanical viewpoint is smaller than the electrically optimal period.

Deviations of the mechanically optimal period from the electrically optimal period occur primarily when a position sensor of an existing machine control system is replaced. If, for example, a sensor of greater accuracy or of higher resolution and which operates according to a different principle is installed in an existing machine control system, the period of the output signal changes as well and is no longer optimally adjusted.

DE 19815438A1 relates to a position measurement device and a method for operating a position measurement device. In particular the use of a signal period variation unit is described which is connected between a position measurement device and an evaluation unit in order to increase the signal frequencies of periodically modulated analog increment signals from the position device or to virtually decrease the geometric period. One embodiment of the signal period variation unit consists of two interpolation devices, which receive the analog increment signals output by the position device and which are out of phase by 90° and which produce digital words which indicate a position value, a conversion table which, via the digital words or the position value, accesses a number of conversion tables in which each position value among the digital words is assigned a particular modified position value so that the result is always a sine- or cosine-shaped signal profile with increased signal period, and two D/A converters, which generate quasi-analog sine- and cosine-shaped increment signals from the table entries which are read out and passes them on to the evaluation unit. In another embodiment, instead of there being two digital words indicating the instantaneous position value, an interpolation unit and a direction recognition unit generate a pulsed digital signal and a direction-indicating direction signal from the analog signals. These signals are fed into an address counter unit 24 which, depending on the desired signal period variation factor, advances by a predetermined number of entries in a conversion table 21A and a conversion table 21B using an address pointer 34A or 34B, the conversion tables storing in digital form signal amplitude values of a sine or cosine function. By increasing the step size when advancing within the tables 21A and 21B the simulated signal period can be adjusted step by step.

EP 0463561B1 and U.S. Pat. No. 5,347,355 describe a signal processing method and a signal processing device and also a system, such as e.g. a displacement detection device in which they are used. From the sine and cosine signals S1 and C1 of a displacement detection device and with the aid of adders, multipliers etc., i.e. using analog circuitry, sine and cosine signals are generated whose signal frequency is a whole number of times greater. The circuit for frequency doubling is incorporated in a processing circuit which, on its input side, doubles the frequency of the sine and cosine signals, which are 90° out of phase, and then converts them by zero transition analysis into division pulses whose number corresponds to the distance between an optical system 101, 102, 104–107 and a diffraction grating 103.

JP 02099826A describes a device for processing a signal of an encoder wherein detection signals with phases from 0 to 90 degrees emitted by detectors are first converted into pulse signals and are then converted into binary code signals in an incremental/decremental counter. By extracting binary code signals of optional weighting in data selection units, pulse signals a and b are obtained which correspond to different frequency divisions of the detection signals. In particular the pulse frequency of the signal a obtained by extracting the slower changing binary code signals is a factor 2 smaller than that of signal b obtained from the binary code signals changing with higher frequency, the lowest valued of these changing with the same frequency as the signal b. A pulse signal c which is phase-shifted by 90° relative to the pulse signal b and which has the same, i.e. halved, frequency as the signal a, is obtained by XORing of the signals a and b. The signals a and c thus generated ensure high precision even when a control circuit with low signal processing speed is employed.

SUMMARY OF THE INVENTION

It is the object of the present invention to provide a method and a device for preparing a signal of a position sensor for transmission to an evaluation unit such that the cooperation between position sensors and evaluation units is improved and/or simplified.

In accordance with a first aspect of the invention, this object is achieved by a method for preparing an analog sensor signal of a position sensor having a scale with a first mechanical period for output to an evaluation unit, the analog sensor signal having a first period which depends on the first mechanical period, comprising the following steps: receiving the analog sensor signal from the position sensor; translating the analog sensor signal into a translated analog signal, the translated analog signal having a second period corresponding to a second mechanical period; and issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the step of translating the analog sensor signal comprises the following substeps: determining from the analog sensor signal a digital absolute position value which determines the position on the scale relative to a section of the scale comprising at least the first instantaneous period section and the second instantaneous period section; and generating the translated analog signal from the digital absolute position value, and wherein the section of the scale relative to which the digital absolute position value determines the position on the scale corresponds to a number of period sections of the second sequence of period sections, the number being equal to k, where k is a whole number, and the digital absolute position value is a digital value with a plurality of bits and the step of generating the translated analog signal comprises the following steps: calculating the result of multiplying by k the remainder of the digital absolute position value divided by k to obtain a calculated digital value; and converting the calculated digital value into the translated analog signal.

In accordance with a second aspect of the invention, this object is achieved by a method for preparing an analog sensor signal of a position sensor having a scale with a first mechanical period for output to an evaluation unit, the analog sensor signal having a first period which depends on the first mechanical period, comprising the following steps: receiving the analog sensor signal from the position sensor; translating the analog sensor signal into a translated analog signal, the translated analog signal having a second period corresponding to a second mechanical period; and issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the step of translating the analog sensor signal comprises the following substeps: determining from the analog sensor signal a digital absolute position value which determines the position on the scale relative to a section of the scale comprising at least the first instantaneous period section and the second instantaneous period section; and generating the translated analog signal from the digital absolute position value, and wherein the section of the scale relative to which the digital absolute position value determines the position on the scale corresponds to a number of period sections of the second sequence of period sections, the number being equal to $2^x$, where x is a whole number, and the digital absolute position value is a digital value with a plurality of bits and the step of generating the translated analog signal comprises the following steps: blanking out the x most significant bits of the digital absolute position value; and converting the unblanked-out part of the digital absolute position value into the translated analog signal.

In accordance with a third aspect of the invention, this object is achieved by a device for preparing an analog sensor signal of a position sensor having a scale with a first mechanical period for output to an evaluation unit, the analog sensor signal having a first period which depends on the first mechanical period, comprising: an input for receiving the analog sensor signal from the position sensor; a unit for translating the analog sensor signal into a translated analog signal, the translated analog signal having a second period corresponding to a second mechanical period; and an output for issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the unit for translating the analog sensor signal comprises: a unit for determining from the analog sensor signal a digital absolute position value which determines the position on the scale relative to a section of the scale comprising at least the first instantaneous period section and the second instantaneous period section; and a unit for generating the translated analog signal from the digital absolute position value, and wherein the section of the scale relative to which the digital absolute position value determines the position on the scale corresponds to a number of period sections of the second sequence of period sections, the number being equal to k, where k is a whole number, and the digital absolute position value is a digital value with a plurality of bits and the unit for generating the translated analog signal comprises: a unit for calculating the result of multiplying by k the remainder of the digital absolute position value divided by k to obtain a calculated digital position value; and a digital/analog converter for converting the calculated digital position value into the translated analog signal.

In accordance with a fourth aspect of the invention, this object is achieved by a device for preparing an analog sensor signal of a position sensor having a scale with a first mechanical period for output to an evaluation unit, the analog sensor signal having a first period which depends on the first mechanical period, comprising: an input for receiving the analog sensor signal from the position sensor; a unit for translating the analog sensor signal into a translated analog signal, the translated analog signal having a second period corresponding to a second mechanical period; and an output for issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the unit for translating the analog sensor signal comprises: a unit for determining from the analog sensor signal a digital absolute position value which determines the position on the scale relative to a section of the scale comprising at least the first instantaneous period section and the second instantaneous period section; and a unit for generating the translated analog signal from the digital absolute position value, and wherein the section of the scale relative to which the digital absolute position value determines the position on the scale corresponds to a number of period sections of the second sequence of period sections, the number being equal to $2^x$, where x is a whole number, and the digital absolute position value is a digital value with a plurality of bits and the unit for generating the translated analog signal comprises: a unit for blanking out the x most significant bits of the digital absolute position value; and a digital/analog converter for converting the unblanked-out part of the digital absolute position value into the translated analog signal.

The present invention is based on the finding that the evaluation of the sensor signals of a position sensor with a mechanical period or, in general terms, the cooperation between position sensors and evaluation units, can be improved by eliminating divergence between the electrically optimal period and the mechanically optimal period. According to the present invention this is achieved in that the position sensor signal, which has a period which depends on the mechanical period of the scale of the position sensor, is translated into a translated signal with a period which corresponds to a second mechanical period, which e.g. has been set to the electrically optimal period, prior to—or for the purpose of—transmitting it to an evaluation unit. Although the outlay for signal preparation prior to the actual evaluation is increased hereby, the period conversion makes it possible to adapt successfully position sensors which, on account of their unfavourable signals or their unfavourable mechanical period, could not hitherto be employed in connection with an existing control or evaluation unit, or only at the cost of increased signal errors, and also to "simulate" an otherwise non-producible, unattachable or unreadable electrically optimal period in preparation for the evaluation by an evaluation unit, whereby not only can transmission errors be minimized and the evaluability improved but a complicated mechanical adjustment of the scale of the position sensor relative to the evaluation unit is avoided.

To translate the sensor signal into a translated signal with a period which corresponds to a different mechanical period than that of the position sensor, an absolute position value can first be determined from the sensor signal which indicates a position on the scale relative to a section of the scale which contains at least one instantaneous period section of the mechanical scale of the position sensor and one instantaneous period section of a scale defined by the simulated mechanical period, whereupon the translated signal is generated from the absolute position value.

In the case where the electrically optimal period is e.g. greater than the mechanical period of the position sensor, the second mechanical period, in relation to which the translated signal is defined, can be set e.g. to a whole number fraction of the mechanical period of the position sensor and the section of the scale for determining the absolute position value corresponds to the instantaneous period section of the sequence of period sections of the scale. In order e.g. to achieve a period conversion of the sensor signal period, which depends on the mechanical period of the position sensor, to a period which corresponds to a mechanical period which is equal to 1/K of the sensor period, K being a whole number greater than zero, an analog/digital converter e.g. can be used to convert the sensor signal of the position sensor into a digital value $D_B$ to obtain the absolute position value $D_B$ in digital form. Subsequently a simple arithmetic unit can be used to calculate the result of multiplying by K the remainder of the division by K of the digital absolute position value $D_B$, i.e. $K \cdot (D_B \bmod K)$, in order to convert the digital value thus obtained into the analog translated signal in a digital/analog converter. The technical effort required for the arithmetic unit for the calculation of the formula $K \cdot (D_B \bmod K)$ reduces to zero for $K=2^N$ since in this case the calculation of $D_B \bmod 2^N$ can be realized by blanking out the N bits of highest significance by discontinuing the corresponding bit lines and the multiplication can be realized by rewiring the lower significance bit lines to the higher significance bit lines. To achieve e.g. a period conversion of the sensor signal period, which depends on the mechanical period of the position sensor, to a period which corresponds to a mechanical period which is equal to $2^{-N}$ of the sensor period, with whole number N greater than 0, an analog/digital converter e.g. can be used to convert the sensor signal of the position sensor into a digital value to obtain the absolute position value $D_B$ in digital form. Subsequently the most significant bits of the digital absolute position value can be blanked out and the digital value so obtained can be converted into the analog translated signal in a digital/analog converter.

In a further embodiment the second mechanical period, in relation to which the translated signal is to be defined, and the mechanical period of the position sensor have e.g. a lowest common multiple, where the second mechanical period may be either smaller or greater than the mechanical period of the position sensor. The section of the scale for calculating the absolute position value then encompasses several successive period sections. To obtain an absolute position value the sensor signal is monitored to establish the period section within the section of the scale for determining the absolute position value to which the instantaneous period section corresponds, in relation to which the sensor signal indicates the position of the scale.

If the device according to the present invention is connected to the position sensor over a short transmission path, the transmission losses of the sensor signals of the position sensor until they reach the input of the device according to the present invention are small even if e.g. the mechanical period of the position sensor has been optimized as regards manufacturability, attachment and readability of the scale and deviates from the electrically optimal period, so that a significant reduction in the transmission losses can be achieved with the present invention.

BRIEF DESCRIPTION OF THE DRAWINGS

Preferred embodiments of the present invention will be described below in more detail making reference to the enclosed drawings, in which.

DESCRIPTION OF THE PREFERRED EMBODIMENTS

Making reference to FIG. 8, the present invention will first be described in the light of an embodiment wherein a position sensor is connected to an evaluation unit and wherein to this end a preparation of sensor signals of the position sensor for output to the evaluation unit according to an embodiment of the present invention is used.

Figure 1A:
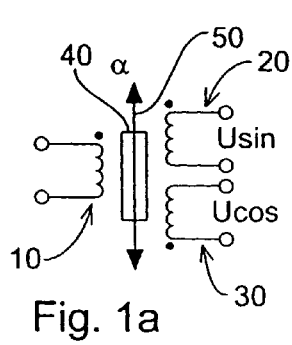
FIGS. 1a 1b and 1c show schematic representations of sensor arrangements for position measurement while generating output signals which are in quadrature to each other.
Figure 1B:
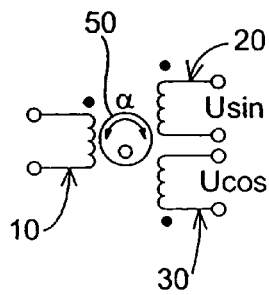
Figure 1C:
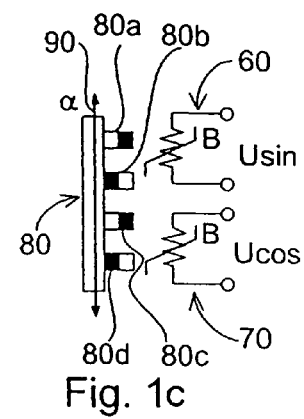
Figure 2:
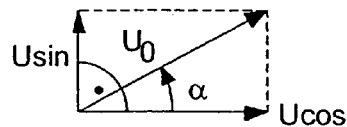
FIG. 2 shows a vector diagram for clarifying the relationship between output signals in quadrature to each other, an excitation signal and an angle of rotation.
Figure 5:
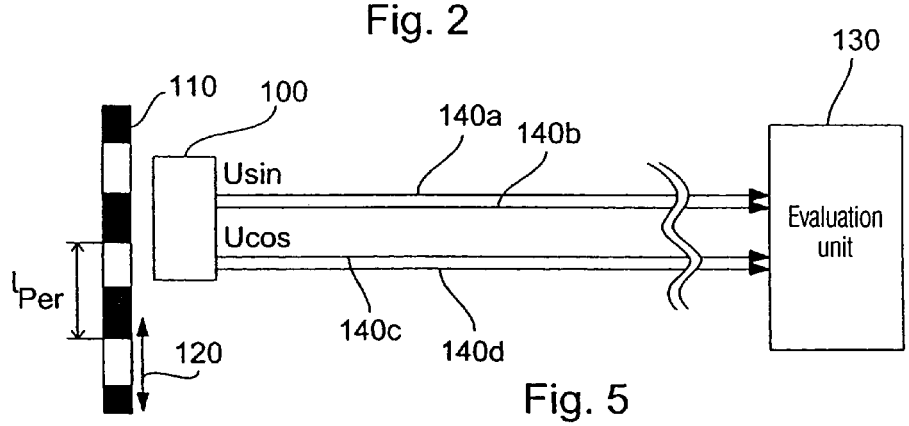
FIG. 5 shows a schematic representation of a direct connection of a position sensor to an evaluation unit.
Figure 8:
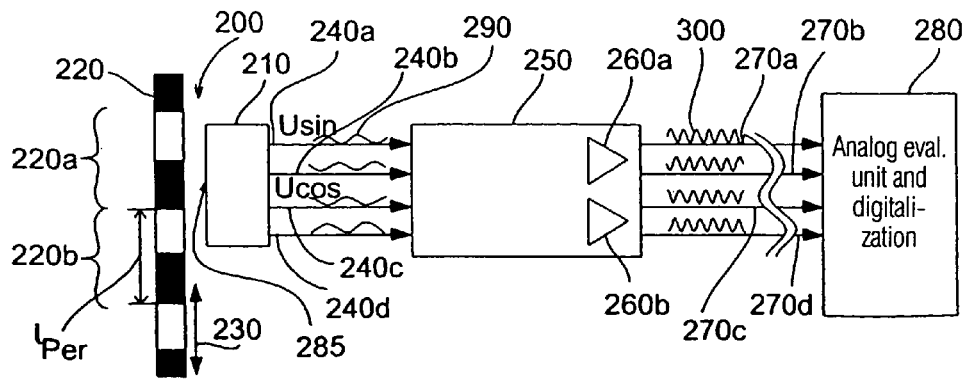
FIG. 8 shows a schematic representation of a device for preparing the sensor signals of a position sensor for output to an evaluation unit according to an embodiment of the present invention.

FIG. 8 shows a position sensor 200 consisting of a sensor unit 210 and a scale 220. The sensor unit 210 and the scale 220 can be moved relative to each other, as shown by the arrow 230. As has already been described in the introductory part of the description, the scale 220 consists of e.g. alternating magnetic sections of opposite polarization, which are represented in FIG. 8 by light and dark or empty and hatched areas. The scale 220 has a mechanical period $l_{PER}$ which is defined by the distance between two successive areas having the same polarization. The scale 220 thus consists of a sequence of contiguous period sections 220a and 220b, each with a length of $l_{PER}$.

The sensor 200, or rather the sensor unit 210, is connected to a period conversion unit 250 via lines 240a, 240b, 240c, 240d and sends to it differentially the sensor signals Usin and Ucos over two lines, 240a, 240b and 240c, 240d, in each case. In an output stage the period conversion unit 250 has two analog line drivers 260a and 260b and is connected to an evaluation unit 280 via possibly long transmission lines 270a, 270b, 270c and 270d.

Having described above the arrangement for transmitting the sensor signals from the sensor 200 to the evaluation unit 280 according to an embodiment of the present invention, the mode of operation of the period conversion unit 250, which performs the preparation of the sensor signals Usin and Ucos for output to the evaluation unit 280 over the transmission lines 270a–270d, will now be described.

Figure 3:
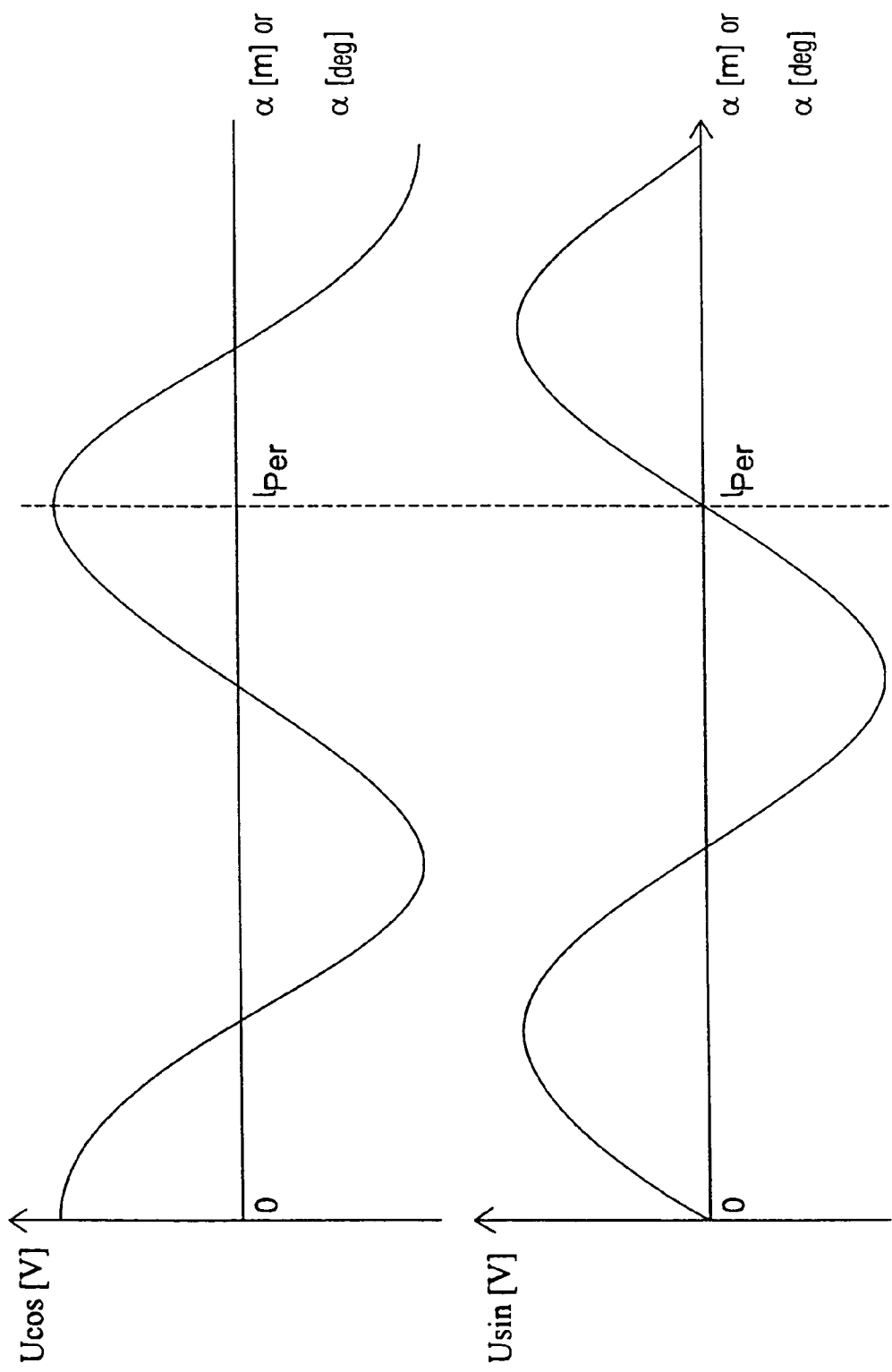
FIG. 3 shows graphs showing the dependence of the sensor signals of the sensor arrangements of FIG. 1a–1c on the angle of rotation or the translational path.
Figure 4:
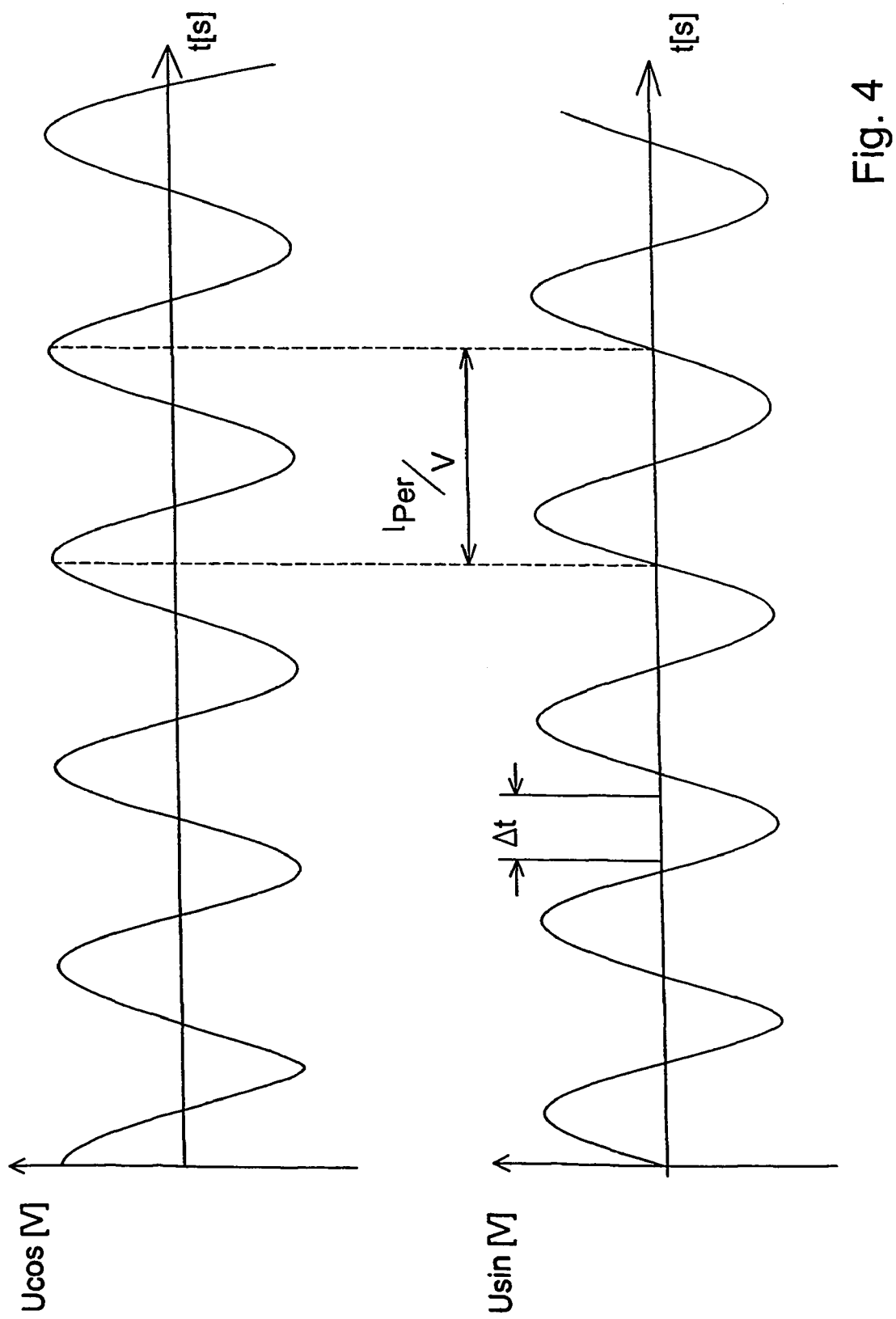
FIG. 4 shows graphs showing exemplary signal profiles of the sensor signals of FIG. 1a–1c as a function of time for the case of a constant rotary or translational velocity.
Figure 6:
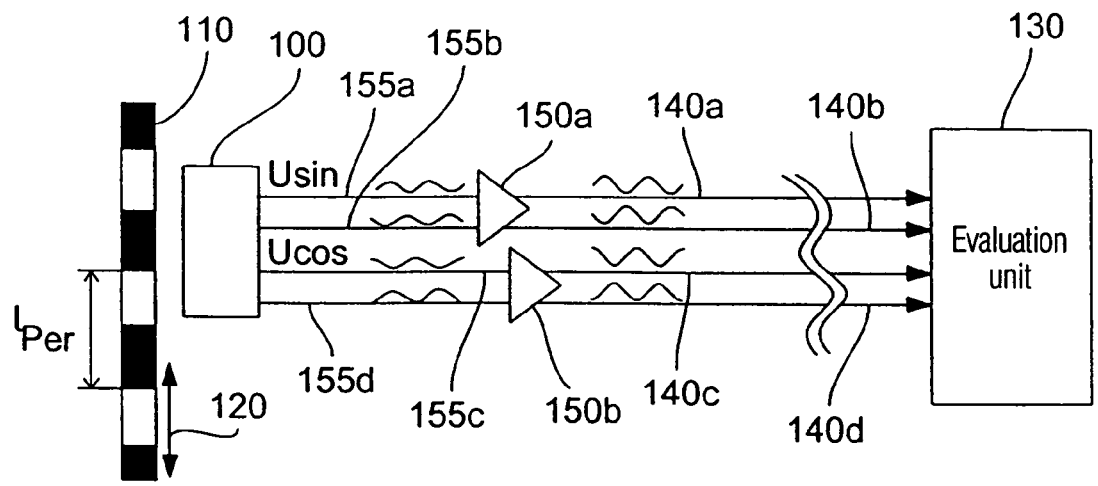
FIG. 6 shows a schematic representation wherein a position sensor is connected to an evaluation unit via line drivers.
Figure 7:
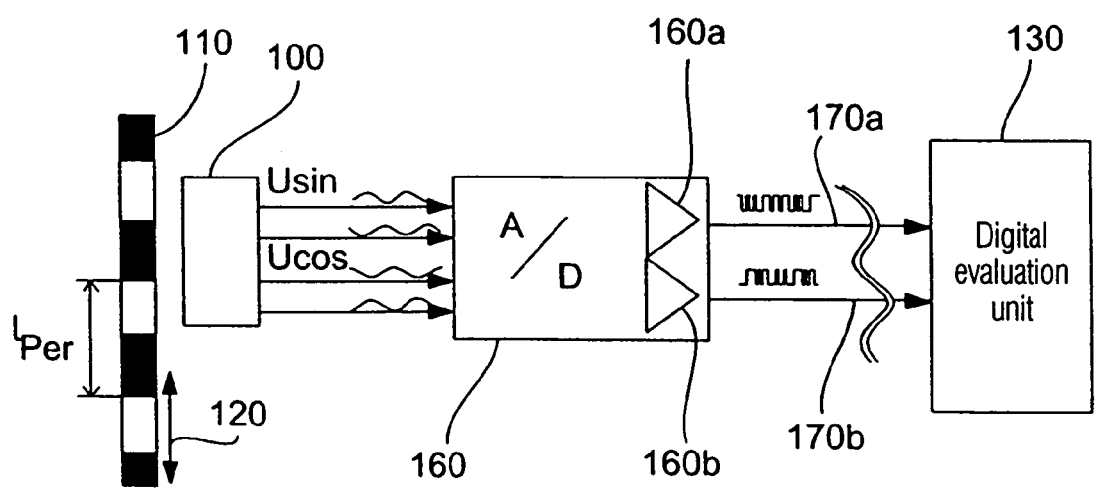
FIG. 7 shows a schematic representation wherein a position sensor is connected to an evaluation unit via an analog/digital converter.

As was mentioned in the introduction to the description, the position sensor 200 issues periodic signals Usin and Ucos as sensor signals, which are represented schematically as wave curves 290 in FIG. 8 and which are represented for the case of a constant translational or angular velocity in FIG. 4. The sensor signals Usin and Ucos have a period which depends on the mechanical period $l_{PER}$ of the scale 220. Expressed more precisely, the sensor signals Usin and Ucos indicate a position detected by the sensor 200 relative to an instantaneous period section 220b since, as has been described with reference to FIG. 3, the sensor signals Usin and Ucos only have an unambiguous relationship to the detected position over the length $l_{PER}$ of a period section. In the case of this position sensor 200, for example, the detected position corresponds to the position of the instantaneous period section 220b of the scale 220 relative to a reference point 285 on the sensor unit 210.

The mechanical period $l_{PER}$ of the scale 220 is preferably chosen on the grounds of optimal manufacturability, attachability and readability of the scale 220. To keep the transmission losses resulting from any higher frequency components of the sensor signals Usin and Ucos small, the period conversion unit 250 can be located near the sensor 200 or can be connected to the sensor 200 over short lines 240a–240d.

The period conversion unit 250 translates the sensor signals Usin and Ucos into signals which are defined in terms of an adjustable or adjusted mechanical period, i.e. into signals having a period which corresponds to this mechanical period, this itself being capable of adjustment so as to be matched to the electrically optimal period, which is optimal as regards the signal evaluation by the evaluation unit 280 and as regards transmission over the transmission lines 270a–270d. In other words, from the point of view of the evaluation unit 280, the period conversion unit 250 simulates sensor signals which would have resulted from a sensor with the adjusted mechanical period or a mechanical period equal to the electrically optimal period. The resulting signals are shown schematically as wave curves 300 in FIG. 8 and they are periodic signals having a period depending on the adjusted mechanical period.

FIG. 8 shows an example of the case where the electrically optimal period is smaller than the mechanical period of the scale 220, which is why the period of the sensor signals 290 is greater than that of the translated signals 300. Due to the period conversion by the period conversion unit 250 the evaluation unit 280 can perform an evaluation of signals which are defined in terms of a mechanical period which is matched to the evaluation and the transmission, thus resulting in an optimal evaluation.

It should be noted that exchanging the position sensor 200 or replacing it with another having a different mechanical period poses no problem since the period conversion unit 250 can again convert the period of the sensor signals Usin and Ucos into signals having a period which depends on the electrically optimal period.

Making reference to FIG. 9, a special embodiment for the period conversion unit 250 of FIG. 8 will now be described for the case where the mechanical period of the position sensor is greater than the electrically optimal period and where the period of the sensor signals is to be converted into a period corresponding to a mechanical period which is equal to $2^{-N}$ of the mechanical period of the position sensor, N being a whole number greater than 0. It should be noted that the elements of FIG. 9 which are identical with elements of FIG. 8 have the same reference numbers as these and that the description of these elements is not repeated.

Figure 9:
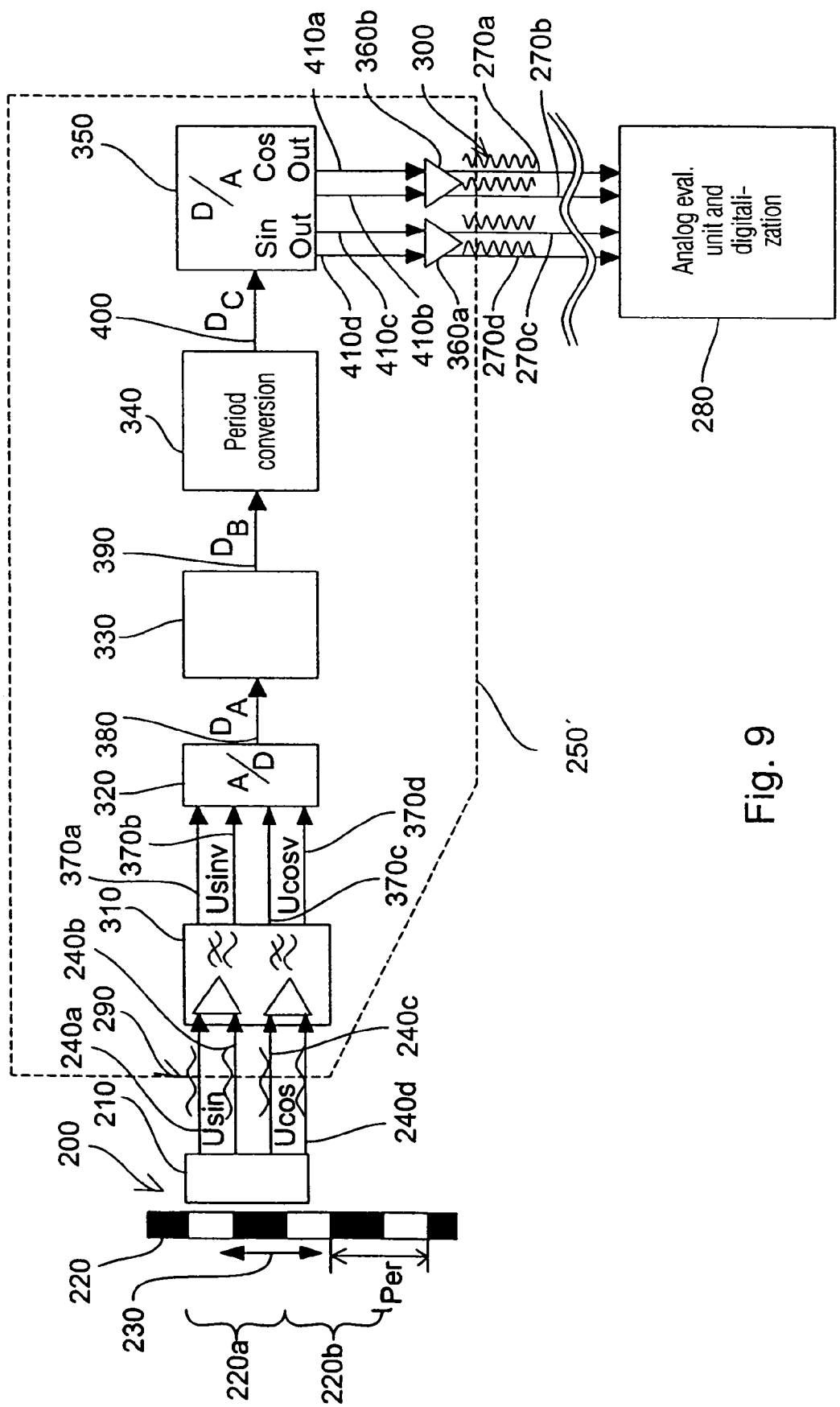
FIG. 9 shows a block diagram of a special embodiment of a device for preparing the sensor signals of a position sensor for output to an evaluation unit, the mechanical period of the position sensor being greater by a power of 2 than the mechanical period corresponding to the translated signal.

The period conversion unit shown in FIG. 9 and which is indicated generally by 250' consists of an analog signal preparation module 310, an analog/digital converter 320, a digital signal preparation module 330, a period conversion module 340, a digital/analog converter 350 and an end stage consisting of two line drivers 360a and 360b. The preparation module 310 is connected to the position sensor 200 via the lines 240a–240d and performs a pre-amplification, signal filtering and preparation of the differentially applied sensor signals Usin and Ucos so as to bring them to the level needed for conversion to a digital signal and to free them e.g. by means of a low-pass filter from high-frequency noise. The preparation module 310 is connected to the analog/digital converter 320 via lines 370a, 370b, 370c and 370d so as to supply the analog/digital converter 320 differentially with the sensor signals in prepared form as signals Usinv and Ucosv.

The analog/digital converter 320 converts the analog signals Usinv and Ucosv by a suitable method into a digital signal $D_A$ and supplies this to the digital signal preparation module 330 via a line 380. The analog/digital conversion by means of the analog/digital converter 320 entails e.g. the calculation of the arctangent function for the signals Usinv and Ucosv. An example of a suitable analog/digital converter is disclosed in the patent application DE10052152, whose applicant is also the applicant of the present application and which is herewith incorporated by reference. The digital signal $D_A$ indicates the position detected by the position sensor 200 in relation to an instantaneous period section 220a or 220b with a certain resolution or a certain number of valid bits. The resolution might e.g. comprise 8 bits, so that within a period section of length $l_{PER}$ $256=2^8$ positions can be coded. Expressed differently, the digital signal $D_A$ represents an absolute position in relation to the instantaneous period section in digital form.

The signal preparation module 330 performs e.g. a temporal low-pass filtering of the digital signal $D_A$ or prepares it in some other way and outputs it in prepared form as a digital signal $D_B$ to the period conversion module 340 via a line 390.

The period conversion module 340 in the embodiment in FIG. 9 is suitable for period conversions in which the mechanical period $l_{PER}$ is divided by a power of 2, i.e. $l_{PER} \rightarrow l_{PER}/2^N$, where N is a whole number greater than or equal to 1. To achieve this the period conversion module 340 blanks out e.g. the N highest value bits of the digital value $D_B$. The value so obtained $D_C$ indicates the position on the scale in relation to an instantaneous period section of a scale whose resolution is $2^N$ times higher than that of the scale 220, as will be explained in more detail making reference to FIG. 10.

After the period conversion the period conversion module 340 sends the digital output signal $D_C$ 400 to the digital/analog converter 350, which generates anew from the digital signal $D_C$ analog sensor signals SinOut and CosOut such as would be generated by a position sensor having a scale with a mechanical period equal to $l_{PER}/2^N$. The signals generated by the converter 350, SinOut and CosOut, represented at 300, are periodic signals just like the signals Usin and Ucos but have a period which is smaller by a factor $2^N$.

The digital/analog converter 350 outputs the generated sensor signals SinOut and CosOut to the line drivers 360a and 360b, which amplify them and output them to the evaluation unit 280 over the transmission lines 270a, 270b, 270c and 270d, via the lines 410a, 410b, 410c and 410d. The amplification can be matched to the transmission conditions so as to optimize the transmission still further.

In the evaluation unit 280 the signals CosOut and SinOut can be used for an analog or, after digitalization, for a digital determination of position.

Accordingly, the mechanical period of the position sensor 200 can, via the agency of the period conversion unit 250', be matched in steps of powers of 2 to the electrically optimal period, which depends on the transmission conditions and the evaluation unit 280.

Figure 10:
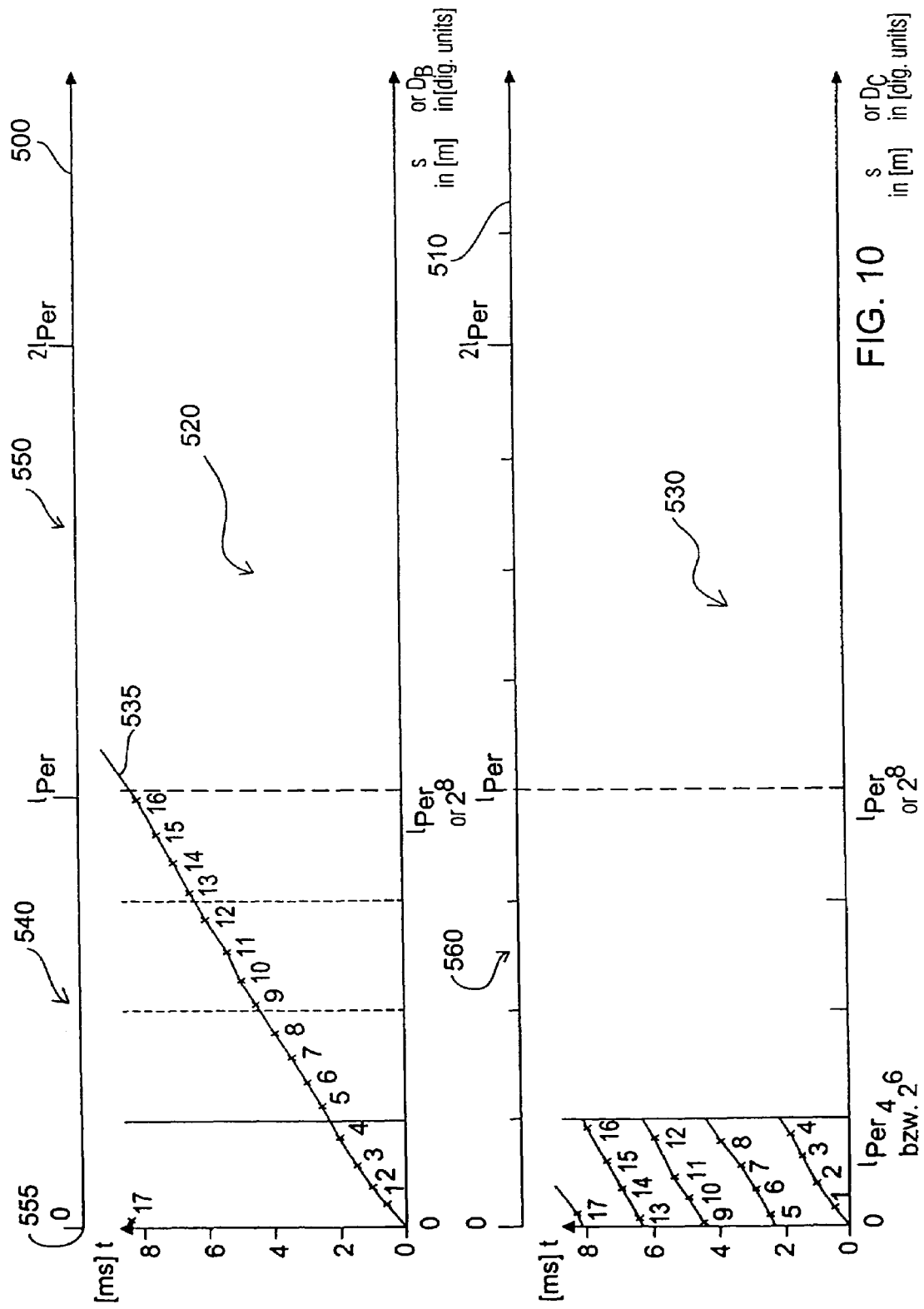
FIG. 10 shows a sketch depicting the scale of a position sensor, the scale as it is determined by the mechanical period of the translated signal and two graphs showing in exemplary form digital values arising in the device of FIG. 9 for the example of a linear displacement.

To clarify the mode of operation of the period conversion module 340 of FIG. 9, the variation in time of the digital signal $D_B$, i.e. of the input signal of the period conversion module 340, and of the digital signal $D_C$, i.e. of the output signal of the period conversion module 340, are shown in FIG. 10 for an example in which the mechanical period of the scale of the position sensor is divided by $4=2^2$. As can be seen, there is no displacement between the scales 500 and 510.

In FIG. 10 a representation of the scale 500 of the position sensor with the mechanical period $l_{PER}$ is followed by that of a scale 510 with a four times smaller division as specified by the conversion ratio, i.e. 4. Under the first/second representation there is a graph showing an exemplary time profile of the digital signals $D_B/D_C$ and the actual displacement between scale and position sensor, the actual displacement s or the digital units of $D_B/D_C$ being plotted along the x-axis and the time t along the y-axis.

The graph 520 shows via a line 535 an exemplary relative displacement of the scale to the position sensor such as results from a start-up process. Crosses indicate the sampled digital values of the digital signal $D_B$, which are numbered from 1 to 17, and whose temporal sampling interval depends on the analog/digital conversion and in the present example has a value of half a millisecond.

As has already been pointed out, the sensor signals of the position sensor provide an unambiguous relationship to the detected position only within a mechanical period $l_{PER}$, and accordingly the possible states of the digital signal $D_B$ encode only a length of $l_{PER}$. In the present case the resolution is e.g. 8 bits, where the value of 11111111 corresponds to the position within the instantaneous period section which is $255/256\ l_{PER}$ from the start of the instantaneous period section. Thus although the linear displacement s changes from the period section 540 to the next period section 550 at about 8 milliseconds, the digital signal $D_B$ just jumps from a high value 16 to a low value 17. Put another way, the digital value $D_B$ always gives a position on the scale measured from a reference point 555 modulo $l_{PER}$.

In the graph 530 the digital values of $D_C$ are shown, also numbered from 1 to 17. As can be seen, the possible states of the signal $D_C$ only encode a region of length $l_{PER}/4$. To achieve this, the period conversion module 340 blanks out the two highest value bits of the digital signal $D_B$, so that the digital values $D_C$ have a resolution of only 6 bits. Blanking out the two highest value bits of the digital value $D_B$ corresponds to the remainder of the digital values $D_B$ modulo $2^6$. The result is that every digital value $D_C$ indicates the position on the scale in relation to the instantaneous period section of the scale 510 or as the distance from the start thereof. Whereas e.g. the digital value $D_B$ or the cross 10 has a value between $2*2^6$ and $3*2^6$ and is defined in relation to the instantaneous period section 540, the digital value $D_C$ or the cross 10 has a value between 0 and $2^6$ and is defined in relation to the instantaneous section 560.

Making reference to FIG. 10, it should be noted that in the present case the period of the original sensor signals Usin and Ucos and also that of the digital signal $D_B$ is four times as great as the period of the generated sensor signals SinOut and CosOut and that of the digital signal $D_C$. The reason for this is that the latter are defined in terms of a mechanical period which is four times smaller and that consequently when traversing the same translational length s more periods are covered. For example, when in FIG. 10 up to the time t=8 ms just one mechanical period $l_{PER}$ is traversed, four mechanical periods $l_{PER}/4$ are traversed. The smaller period of the signals CosOut and SinOut can e.g. be advantageous as regards evaluation since it requires a less exact calculation of the ratio of the two signals for the same degree of accuracy.

Figure 11:
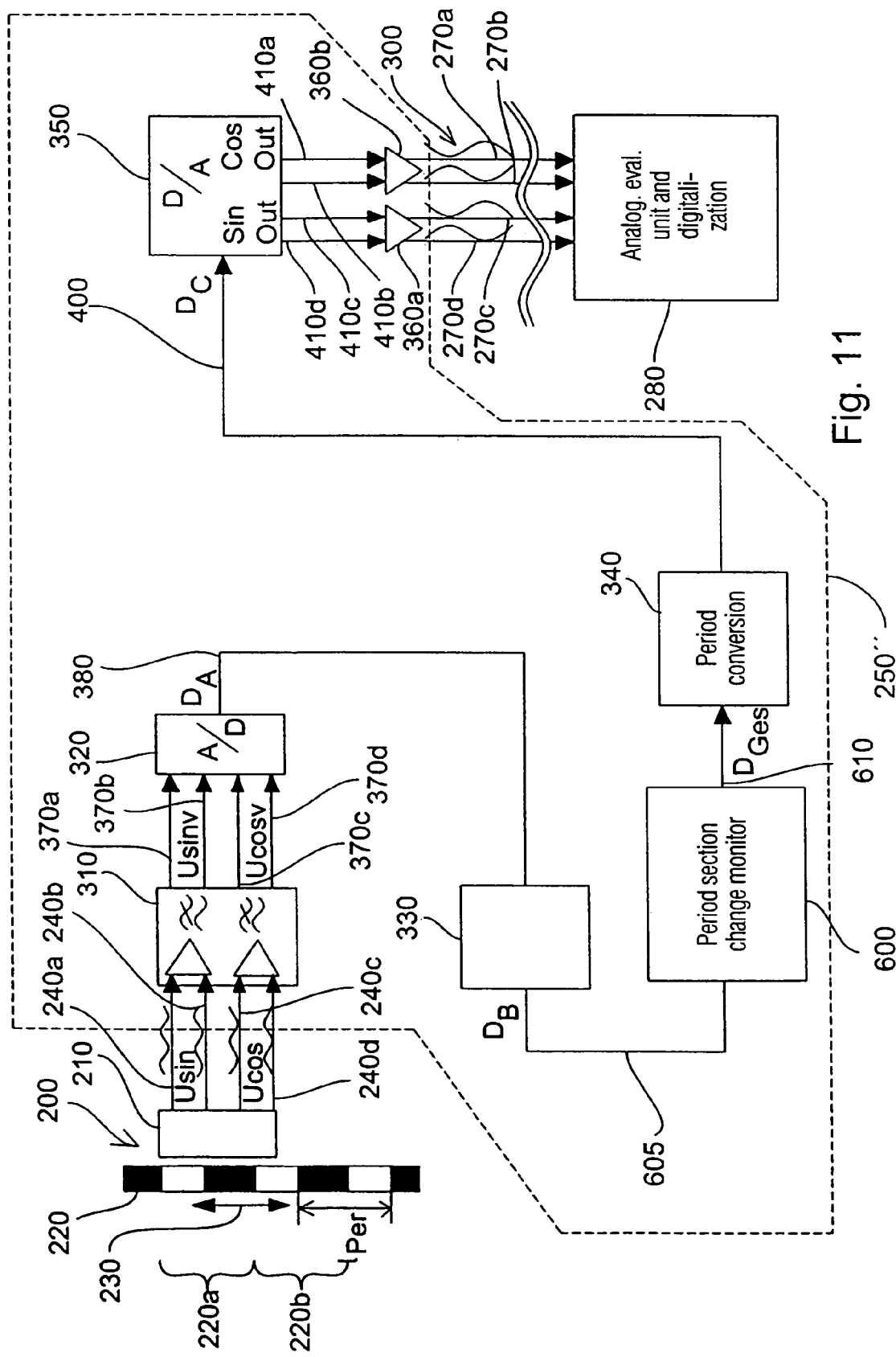
FIG. 11 shows a block diagram of a special embodiment of a device for preparing the sensor signals of a position sensor for output to an evaluation unit, the mechanical period of the position sensor and the mechanical period corresponding to the period of the translated signal having a lowest common integral multiple.

FIG. 11 shows an embodiment of a period conversion unit 250" which differs from that of FIG. 9 only in that it is also capable of period conversions for which the mechanical period in relation to which the generated sensor signals SinOut and CosOut are to be defined is greater than the mechanical period of the position sensor. In the present embodiment the period conversion unit 250" is able to translate the period of the sensor signals of the position sensor into signals having a period corresponding to a mechanical period which can adopt any value which has a lowest common multiple with the mechanical period of the position sensor. In the following description of FIG. 11 elements which are identical to those of FIG. 9 are denoted by the same reference numerals and these elements are not described again.

The period conversion unit 250" of FIG. 11 differs from that in FIG. 9 only in that a period section change monitor 600 is included in the circuit between the preparation module 330 and the period conversion module 340 via a line 605 and a line 610, and that the digital value $D_B$, which corresponds to the absolute position in relation to an instantaneous period section of the scale 220 of the position sensor 200, is converted by the period section change monitor 600 into a digital value which indicates the position in relation to a section of the scale 220 which consists of a number of period sections of the scale 220. If e.g. a mechanical period of a/b $l_{PER}$ is to be simulated, where $a*l_{PER}$ is the lowest common multiple, then the position in relation to a successive period sections is determined from $D_B$.

To achieve this the period section change monitor 600 receives $D_B$ over a line 605 from the preparation module 330 and monitors the values $D_B$ to see to which period section of the a successive period sections the instantaneous period section corresponds in relation to which $D_B$ indicates the position. The unit 600 might e.g. include a digital counter which, if the digital signal $D_B$ quits either upwards or downwards the representable region, which is limited by the digital resolution, can increment or decrement a counter value and thus form the modulus a. If e.g. a mechanical period is to be simulated from the viewpoint of the evaluation unit which is double the value of the mechanical period $l_{PER}$ of the position sensor 200, a counter value with one bit is sufficient. The monitor 600 expands the digital value $D_B$ by the counter value on the higher value side and outputs the result as the digital signal $D_{Ges}$ to the period conversion module 340 over the line 610.

The digital signal $D_{Ges}$ thus represents an absolute position in relation to a section of the scale which consists of a number of period sections. The period conversion module

340 divides this region e.g. as in FIG. 9 through blanking out of the low valued bits or through a normal division into b parts. In this way a mechanical period of a/b in general and e.g. in particular a mechanical period of $3/8*l_{PER}$ could be simulated in that the period section change monitor 600 appropriately increments or decrements the counter value in response to overflow or underflow of the digital value $D_B$ and takes account thereby of a modulus of 3 and appends the counter value to the digital value $D_B$ to obtain $D_{Ges}$ and the period conversion module 340 removes the three highest value bits from the digital signal $D_{Ges}$, which refers to an absolute position in relation to three successive period sections of length $l_{PER}$.

On the basis of the above description it is possible to realize an evaluation system for sensor signals that is preferably located in the neighbourhood of the sensor, which evaluates the sensor signals and outputs them with a choice of amplitude and period. The optimal period at the sensor and the signal level at the sensor are thereby translated into the optimal period and the optimal level for the transmission to the machine control and for the machine control and for the signal evaluation of the machine control.

Sensors which, because of their unfavourable signals or their unfavourable signal period, could not up till now be deployed in connection with available controls can be adapted by means of the preparation or period conversion described above. Changing the period can be accompanied by a filtering and thus a preparation of the signals, so that a sensor can be fitted into various controls or several different sensors can be fitted into the same control.

It should be noted that although the object of the foregoing description was a position sensor for linear movements, the present invention is also applicable to other position sensors, such as e.g. rotational variable differential transformers. Furthermore, the present invention is applicable not only to magnetic sensors but also to optical or mechanical sensors. In the case of an optical sensor the scale can e.g. comprise a grey scaling with a sine-shaped grey shade profile. Thus all magnetic, optical or mechanical rotational or translational senders are feasible as position sensors. Accordingly, the present invention is applicable without qualification to sensors which emit only one signal and not only to those which emit signals which are in quadrature to each other. The differential feeding of the sensor signals into the period conversion unit, a feature which has been referred to in the text, can also be replaced by some other feeding mode.

With reference to the conversion ratio in connection with the mechanical period of the position sensor and of the mechanical period in relation to which the translated signal is to be defined, or the conversion ratio of the sensor signal period and of the period of the translated signal, it should be noted that in general ratios can also be chosen for which the mechanical period of the position sensor and that to which the translated signal refers do not have a common multiple. In this case the period section change monitor would have to create from the absolute position value in relation to the mechanical period a position value which is absolute in relation to a reference point of the scale of the position sensor. Furthermore, other divider ratios than a power of 2 can also be realized for the period conversion module of FIGS. 9 and 11 by employing a divider which divides the digital value $D_B$ by a whole number. In particular it is possible to provide a period conversion of the sensor signal period, which depends on the mechanical period of the position sensor, which corresponds to a mechanical period equal to 1/K in the case of FIG. 9 and x/K in the case of FIG. 11 ($x \in \mathbb{N}$) of the sensor period by modifying the period conversion module 340 of FIG. 9 or 11 to a computational unit which calculates the digital value $D_C$ from the digital value $D_B$ or $D_{Ges}$ as K times the remainder of the division by K of the digital absolute position value $D_B$, i.e. as $D_C = K \cdot (D_B \bmod K)$ or $D_C = K \cdot (D_{Ges} \bmod K)$.

Furthermore, various modules and units of FIGS. 9 and 11 can also be dispensed with, e.g. the preparation modules. For a whole number multiplication of the sensor signal period the period conversion module e.g. can be dispensed with, only the period section change monitor being needed. The line drivers at the output stage can also be dispensed with.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for preparing an analog sensor signal of a position sensor having a scale with a first mechanical period for output to an evaluation unit, the analog sensor signal having a first period which depends on the first mechanical period, comprising the following steps:

receiving the analog sensor signal from the position sensor;

translating the analog sensor signal into a translated analog signal, the translated analog signal having a second period corresponding to a second mechanical period; and issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the step of translating the analog sensor signal comprises the following sub-steps:

determining from the analog sensor signal a digital absolute position value which determines the position on the scale relative to a section of the scale comprising at least the first instantaneous period section and the second instantaneous period section; and generating the translated analog signal from the digital absolute position value, and wherein the section of the scale relative to which the digital absolute position value determines the position on the scale corresponds to a number of period sections of the second sequence of period sections, the number being equal to k, where k is a whole number, and the digital absolute position value is a digital value with a plurality of bits and the step of generating the translated analog signal comprises the following steps:

calculating the result of multiplying by k the remainder of the digital absolute position value divided by k to obtain a calculated digital value; and converting the calculated digital value into the translated analog signal.

2. A method for preparing an analog sensor signal of a position sensor having a scale with a first mechanical period for output to an evaluation unit, the analog sensor signal having a first period which depends on the first mechanical period, comprising the following steps:

receiving the analog sensor signal from the position sensor;

translating the analog sensor signal into a translated analog signal, the translated analog signal having a second period corresponding to a second mechanical period; and issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the step of translating the analog sensor signal comprises the following sub-steps:

determining from the analog sensor signal a digital absolute position value which determines the position on the scale relative to a section of the scale comprising at least the first instantaneous period section and the second instantaneous period section; and generating the translated analog signal from the digital absolute position value, and wherein the section of the scale relative to which the digital absolute position value determines the position on the scale corresponds to a number of period sections of the second sequence of period sections, the number being equal to $2^x$, where x is a whole number, and the digital absolute position value is a digital value with a plurality of bits and the step of generating the translated analog signal comprises the following steps:

blanking out the x most significant bits of the digital absolute position value; and converting the unblanked-out part of the digital absolute position value into the translated analog signal.

3. A device for preparing an analog sensor signal of a position sensor having a scale with a first mechanical period for output to an evaluation unit, the analog sensor signal having a first period which depends on the first mechanical period, comprising:

an input for receiving the analog sensor signal from the position sensor;

a unit for translating the analog sensor signal into a translated analog signal, the translated analog signal having a second period corresponding to a second mechanical period; and an output for issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the unit for translating the analog sensor signal comprises:

a unit for determining from the analog sensor signal a digital absolute position value which determines the position on the scale relative to a section of the scale comprising at least the first instantaneous period section and the second instantaneous period section; and a unit for generating the translated analog signal from the digital absolute position value, and wherein the section of the scale relative to which the digital absolute position value determines the position on the scale corresponds to a number of period sections of the second sequence of period sections, the number being equal to k, where k is a whole number, and the digital absolute position value is a digital value with a plurality of bits and the unit for generating the translated analog signal comprises:

a unit for calculating the result of multiplying by k the remainder of the digital absolute position value divided by k to obtain a calculated digital position value; and a digital/analog converter for converting the calculated digital position value into the translated analog signal.

4. A device for preparing an analog sensor signal of a position sensor having a scale with a first mechanical period for output to an evaluation unit, the analog sensor signal having a first period which depends on the first mechanical period, comprising:

an input for receiving the analog sensor signal from the position sensor;

a unit for translating the analog sensor signal into a translated analog signal, the translated analog signal having a second period corresponding to a second mechanical period; and an output for issuing the translated analog signal to the evaluation unit, wherein the analog sensor signal indicates a position on the scale relative to a first instantaneous period section, the one containing the position, of a sequence of period sections constituting the scale of the position sensor, and the translated analog signal indicates the position on the scale relative to a second instantaneous period section, the one containing the position, of a second sequence of period sections determined by the second mechanical period, and wherein the unit for translating the analog sensor signal comprises:

a unit for determining from the analog sensor signal a digital absolute position value which determines the position on the scale relative to a section of the scale comprising at least the first instantaneous period section and the second instantaneous period section; and a unit for generating the translated analog signal from the digital absolute position value, and wherein the section of the scale relative to which the digital absolute position value determines the position on the scale corresponds to a number of period sections of the second sequence of period sections, the number being equal to $2^x$, where x is a whole number, and the digital absolute position value is a digital value with a plurality of bits and the unit for generating the translated analog signal comprises:

a unit for blanking out the x most significant bits of the digital absolute position value; and a digital/analog converter for converting the unblanked-out part of the digital absolute position value into the translated analog signal.

5. The device according to claim 3, wherein the first mechanical period and the second mechanical period have a lowest common multiple and the section of the scale relative to which the absolute position value determines the position on the scale corresponds to a first number of contiguous period sections of the first sequence of period sections and to a second number of contiguous period sections of the second sequence of period sections, and wherein the unit for determining the digital absolute position value comprises:
- a unit for monitoring the analog sensor signal to establish to which of the period sections of the first number of contiguous period sections within the section of the scale the first instantaneous period section corresponds relative to which the analog sensor signal indicates the position on the scale; and
- a unit for calculating the digital absolute position value on the basis of the result of the monitoring and the analog sensor signal.

6. The device according to claim 3, wherein the first mechanical period is an integral multiple of the second mechanical period and the section of the scale relative to which the absolute position value determines the position on the scale corresponds to the first instantaneous period section.

7. The device according to claim 3, wherein the unit for determining the position on the scale relative to the section of the scale comprises:
- an analog/digital converter for converting the analog sensor signal into a digital absolute position value.

8. The device according to claim 3, wherein the analog sensor signal comprises two analog subsignals in quadrature to each other which indicate a position on the scale which is only unambiguous relative to the instantaneous period section.

9. The device according to claim 3, wherein the device is connected to the position sensor via a short transmission path, so that transmission losses of the analog sensor signal until it reaches the input of the device are small.

10. The device according to claim 3, wherein the first mechanical period is adapted so as to be optimal as regards manufacture, attachment and readability of the scale and the second mechanical period is adapted so as to be optimal as regards signal transmission of the translated analog signal to the evaluation unit and evaluation of the translated analog signal by the evaluation unit.

11. The device according to claim 3, wherein the second mechanical period is adjustable.

* * * * *